(12) United States Patent
Denman

(10) Patent No.: US 10,982,401 B1
(45) Date of Patent: Apr. 20, 2021

(54) FLOATING BOAT TELESCOPICALLY EXTENDABLE FENDER REDUCING MARINE GROWTH

(71) Applicant: Bryan Denman, St Augustine, FL (US)

(72) Inventor: Bryan Denman, St Augustine, FL (US)

( * ) Notice: Subject to any disclaimer, the term of this patent is extended or adjusted under 35 U.S.C. 154(b) by 0 days.

(21) Appl. No.: 16/849,462

(22) Filed: Apr. 15, 2020

(51) Int. Cl.
*E02B 3/26* (2006.01)

(52) U.S. Cl.
CPC ...................................... *E02B 3/26* (2013.01)

(58) Field of Classification Search
CPC .............. E02B 3/26; E02B 3/28; E01D 19/02
See application file for complete search history.

(56) References Cited

U.S. PATENT DOCUMENTS

| | | | |
|---|---|---|---|
| 2,844,943 A | 7/1958 | Kennedy | |
| 4,227,832 A * | 10/1980 | Leone | E02B 3/26 405/215 |
| 5,007,363 A | 4/1991 | James | |
| 5,014,638 A * | 5/1991 | Ilves | B63B 21/00 114/230.18 |
| 5,603,280 A * | 2/1997 | Shackelford, Jr. | E02B 3/24 114/230.27 |
| 6,406,221 B1 * | 6/2002 | Collier | E02B 17/0017 405/213 |
| 7,322,307 B1 | 1/2008 | Perry | |
| 7,370,595 B1 * | 5/2008 | Ahlquist | E02B 3/28 114/219 |
| 8,291,846 B2 * | 10/2012 | Bender | E02B 3/24 114/219 |
| 2015/0314841 A1 * | 11/2015 | Moran | B63B 59/02 114/219 |

* cited by examiner

*Primary Examiner* — Benjamin F Fiorello
(74) *Attorney, Agent, or Firm* — Malin Haley DiMaggio & Bowen, P.A.

(57) ABSTRACT

A boat fender having a fender body of first and second concentric tubes, telescopically joined, for strength and extra length for large tidal variations. The fender body is supported on a ballast of sufficient buoyancy to keep the fender body above the water line to reduce or prevent marine growth, such as barnacles, during operation. The boat fender body is vertically supported by a bracket with a lateral spacer that is attached to a mooring facility, minimizing the fender body from contacting the mooring facility from wave action.

4 Claims, 5 Drawing Sheets

FLOATING BOAT TELESCOPICALLY EXTENDABLE FENDER REDUCING MARINE GROWTH

BACKGROUND OF THE INVENTION

1. Field of the Invention

A floating boat fender and mooring bracket to protect a floating vessel from contacting a dock, seawall, anchor post or other boat securing barrier that allows the vertical, tubular, telescopically extendable, fender to move vertically above the surface of the water, at high and low tides, to reduce marine growth on the fender body, and for use in areas with large tidal high-low variations.

2. Related Art

The use of vertically-movable boat fenders, secured to a dock or mooring post, is known in the prior art. U.S. Pat. No. 2,844,943 granted Jul. 29, 1958 shows a Pier Bumper that has guide wheels to intersect the hull of a boat and a pair of floats that keep the guide wheels moving with tide. U.S. Pat. No. 5,007,363 granted Apr. 16, 1991 shows a Gunnel Saver Dock and Mooring Fender that is buoyant and controlled by top and bottom caps which have stops on the buoyancy of the fender. U.S. Pat. No. 7,322,307 issue Jan. 29, 2008 shows a Buoyant Bumper System that attaches to a dock facility that can rise and fall with the tides.

None of the references describe a boat fender that has a tubular, telescopically-extendable, strengthened fender body, for use in large high, low tidal differential areas, attached to a suitable bottom ballast to keep the vertical boat fender structure out of the water, regardless of the tide, to eliminate marine growth, such as barnacles, on the boat fender exterior body.

SUMMARY OF THE INVENTION

A floating boat tubular, telescopically-extendable, fender and a mooring bracket connected to a mooring facility such as piling, wooden post, or wooden or concrete dock or sea wall, that supports the fender vertically and movably, for protecting a boat, floating in a body of water, from striking a mooring facility.

The fender telescopically-extendable, tubular main body is comprised of an elongated first rigid tube, a second rigid tube with a smaller diameter, moveably mounted concentrically inside a portion of said first tube, said first and second tubes telescopically joined, that form the fender main body. The first tube upper main fender body is movably connected to the mooring bracket that connects firmly to a mooring facility such as a piling, wooden post, or concrete dock or sea wall. The mooring bracket is a vertical tube for receiving the fender main body and includes a flat vertical wall, at least five inches wide, to provide clearance space between the mooring facility and the fender main body when attached to a mooring facility.

The fender body first rigid tube and the second rigid tube have concentric tubular sections designed to slide longitudinally inside one another and that significantly increase the barrier strength of the main fender body against collisions of boats. The first and second tubes can be constructed of light weight, high strength polyvinyl chloride (PVC), carbon fiber, or other suitable durable materials.

The fender vertical tubular main body has a first tube that is the upper, outer fender body. A top cap is connected at the upper end of the first tube, sealing the fender main body tube end, to prevent water or moisture from entering the upper end of the fender main body.

The second tube, slidably mounted inside the upper first tube, forms the lower, bottom end of the fender main body. A ballast is connected to the bottom, lower end of the second tube that forms the fender main body.

The ballast is sized in volume and buoyancy to displace an amount of water substantially equal in weight to the fender main body first and second tubes' total weight. Therefore the ballast is capable of producing a buoyant force substantially equal to the weight of the first and second tubes forming the main body of the fender. This fender buoyancy ensures that almost all of the vertical main fender body is supported above the water at all times, whether high or low tide, thereby eliminating or reducing marine growth on the surfaces of the fender main body.

While floating, the vertical fender is slidably mounted to a mooring facility by a singular mooring bracket having a tubular vertical fender support on one end, a middle spacing plate to space the fender from the mooring facility, and a pair of opposite facing fastener tabs to secure the mooring bracket to a fixed mooring system.

In one embodiment, the fender mooring bracket has an inner facing vertical edge with upper and lower fastener tabs; a vertical tube (for holding the tubular fender body) on its outer facing vertical end; and a flat rigid middle section (about five inches wide) for spacing the fender mounted in the bracket vertical tube away from the mooring facility and the bracket inner edge fastener tabs.

The mooring bracket inner vertical edge has upper and lower extending tabs including a first upper tab extending at an angle to a first side of the bracket spacing plane and a lower second tab extending at an angle to the opposite side of the spacer plane. The first and second tabs have apertures (two) that receive bolts or screws that firmly fix the mooring bracket vertical top and bottom inner edges to the mooring facility, such as a wooden piling.

The mooring bracket vertical tube has an inside diameter slightly larger than the outside diameter of the first upper tube of the fender main body. The bracket fastener tabs extend outwardly about three inches to engage a piling surface for attaching bolts to permanently mount the fender bracket. The fasteners for securing the mooring bracket can vary, depending on the mooring facility such as a piling, a wooden or concrete dock, or a seawall. The fender bracket does not move but is fixed in place. The bracket location vertically is selected so that the bracket is above the waterline at all times, high or low tide.

With the present fender ballast attached at the lower end of the fender tube body, the fender tubular main body can be attached to a bracket that surrounds the tube body, allowing vertical movement of the fender, caused by the tide.

The fender ballast can be a cylindrically-shaped container, filled with air or buoyant material, that is firmly attached to the second tube lower end and sealed, water-proof and air tight, for supporting the entire vertical main fender body that includes the first tube and the second tube telescopically-mounted inside the first tube. Other container shapes of the ballast can be used. The ballast is sized in volume to create a buoyant force when placed in water that substantially equals the weight of the boat fender tube main body and end cap of the fender when suspended vertically above the water.

Whether the fender is in a high tide or low tide, the fender ballast will float substantially on top of the water or slightly below the water surface, extending the fender tube body always above the water, to prevent marine growth on the body of the fender.

The single fender mooring bracket provided includes a flat vertical spacer plate extending out from a mooring facility and is sized in vertical width to firmly minimize the fender body horizontally from engaging the mooring facility.

It is an object of this invention provide an improved boat fender and mooring bracket for a boat mooring facility in which the fender body includes telescopically-movable first and second tubes forming the tubular main body for increased strength as a barrier and for use in areas with extreme variations in the height and depth of the tides and water levels.

It is an another object of this invention to provide an improved fender for a boat at a mooring facility in which the fender body will not be subjugated to marine growth, such as barnacles, during its operation, whether at high or low tide.

It is yet another object of the invention to provide an improved vertically-movable fender that includes a sufficient ballast that can float the lowest portion of the fender body at or above the surface of the water.

BRIEF DESCRIPTION OF THE DRAWINGS OF THE INVENTION

REFERRED EMBODIMENT OF THE INVENTION

Figure 1:
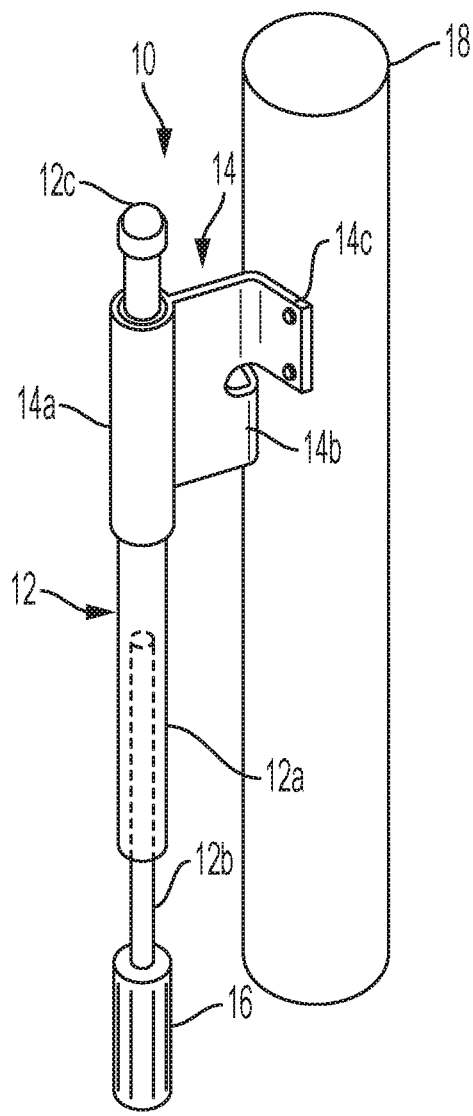
FIG. 1 shows a front perspective view of the invention mounted on a piling.
Figure 2:
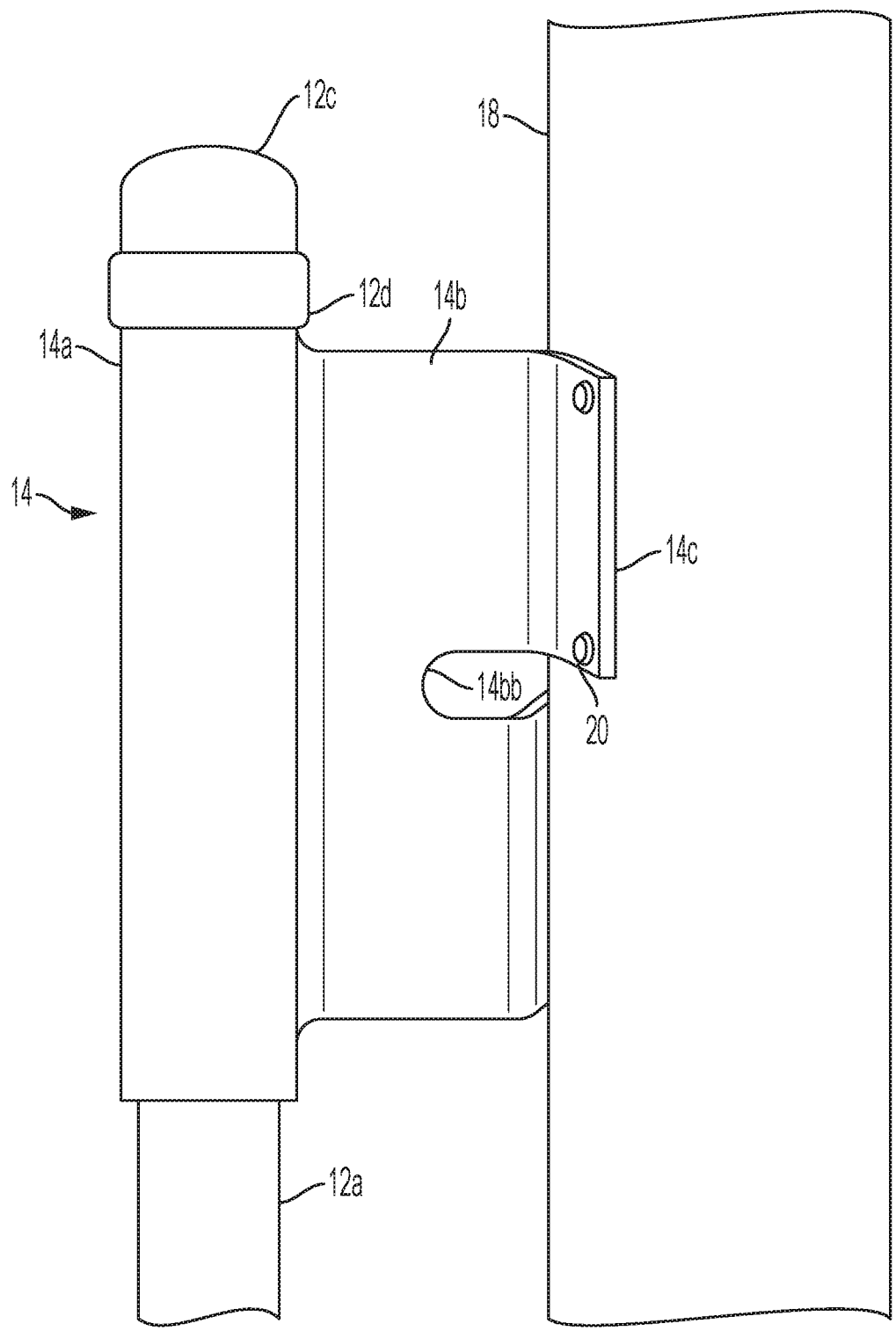
FIG. 2 shows a side elevational view of the mooring bracket supporting the upper first tube of the fender main body to a piling.

Referring now to the drawings, and in particular FIGS. 1 and 2, a floating fender 12, attached by mooring bracket 14 to a mooring facility piling 18, representing one embodiment of the invention 10, is shown. A rigid mooring bracket 14 is attached to mooring facility piling 18 by a plurality of fasteners 20 in bracket tabs 14b and 14c. In some embodiments, the boat fender 10 includes a vertically-oriented, tubular main body 12 that is slidably attached inside of mooring bracket tubular mount 14a to allow for fender vertical up-and-down movement. Ballast 16 keeps fender 12 above the water line at all times.

The fender elongated tubular main body 12 represents the fender body that will contact a moored boat or floating object to protect the boat from contacting or striking a mooring facility 18. In some embodiments, the fender main body 12 is comprised of two members, a first tube 12a forming the upper, top exterior fender body portion and a second inner concentric tube 12b forming the lower, bottom fender body. The telescopically joined first tube 12a and second tube 12b make the fender body 12 very strong as a barrier, while being light enough from strong carbon materials for floating with a ballast. The use of first and second concentric tubes, each of which provides length and distance, from extending top to bottom, greatly increases the fender length for extreme high and low tidal variations found in some areas.

A cap 12c is fixed to the upper end of first tube 12a as a sealed end to prevent water from entering the fender main body 12.

Attached to the bottom end of fender body 12 is a cylindrically-shaped waterproof, water-engaging ballast 16 comprising a container that may be filled with air (empty) or with a light-weight buoyant material that is less dense than water. Also the ballast could be shaped as a sphere, because a sphere represents the minimum surface area that occupies the maximum volume. The ballast 16 is sized in volume so that it can displace a volume of water that is approximately equal to the weight of the fender main body 12 (tubes 12a and 12b combined) or at least in close approximation. Therefore the buoyant force produced by ballast 16 would be sufficient to maintain fender body 12 above a water body by floating to prevent fender body 12 from being subject to marine growth, such as barnacles, since the fender body 12 will not be in or under the water, regardless of the height of the tide. The ballast shape can vary dependent on the mooring facility, fender weight and length, and vessel type.

The particular construction of fender main telescopically-extending tubular body 12 (tube 12a and tube 12b) is stronger than a single tube and can be of any suitable material to act as a fender, acting as a barrier cushion for a floating vessel, such as a boat. In one embodiment, the fender main body material is carbon fiber polymers that are extremely strong but light weight. The material is strong enough to endure moving vessel contact, touching, rubbing and moving surface and body strikes when contacting a boat gunwale or hull, but sufficiently resilient to prevent any damage to a boat hull by striking or rubbing. The boat fender body 12 may be constructed of other known suitable plastics or other artificial materials. Large tidal swings could require quite long fender bodies that are aided by the two telescopically-mounted first and second tubes forming the fender body.

Referring now to FIG. 2, the mooring bracket 14 is shown attached to a piling 18 with the two bolt fasteners 20 inserted through bracket upper tab 14c that extends horizontally, angularly away from interior flat surface spacer 14b. Below tab 14c is a lower tab 14d (FIG. 4) extending horizontally, angularly in the opposite direction separated by opening 14bb that separates the upper tab 14c from the lower tab which is also a fixed to piling 18 by bolts not visible in FIG. 2) on the opposite side of the bracket flat spacer 14b.

Figure 3:
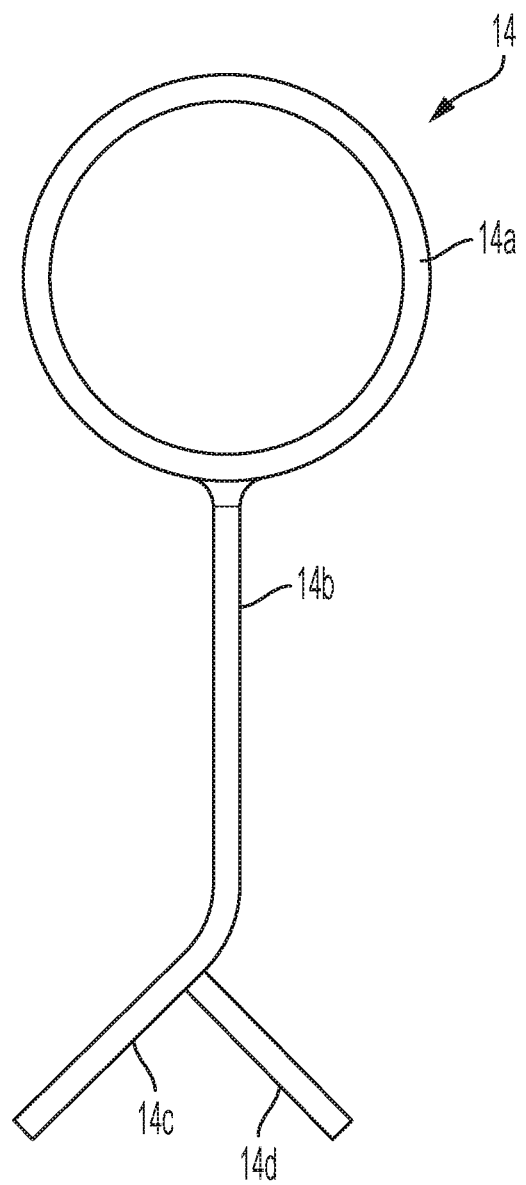
FIG. 3 shows a top plan view of the mooring bracket.
Figure 4:
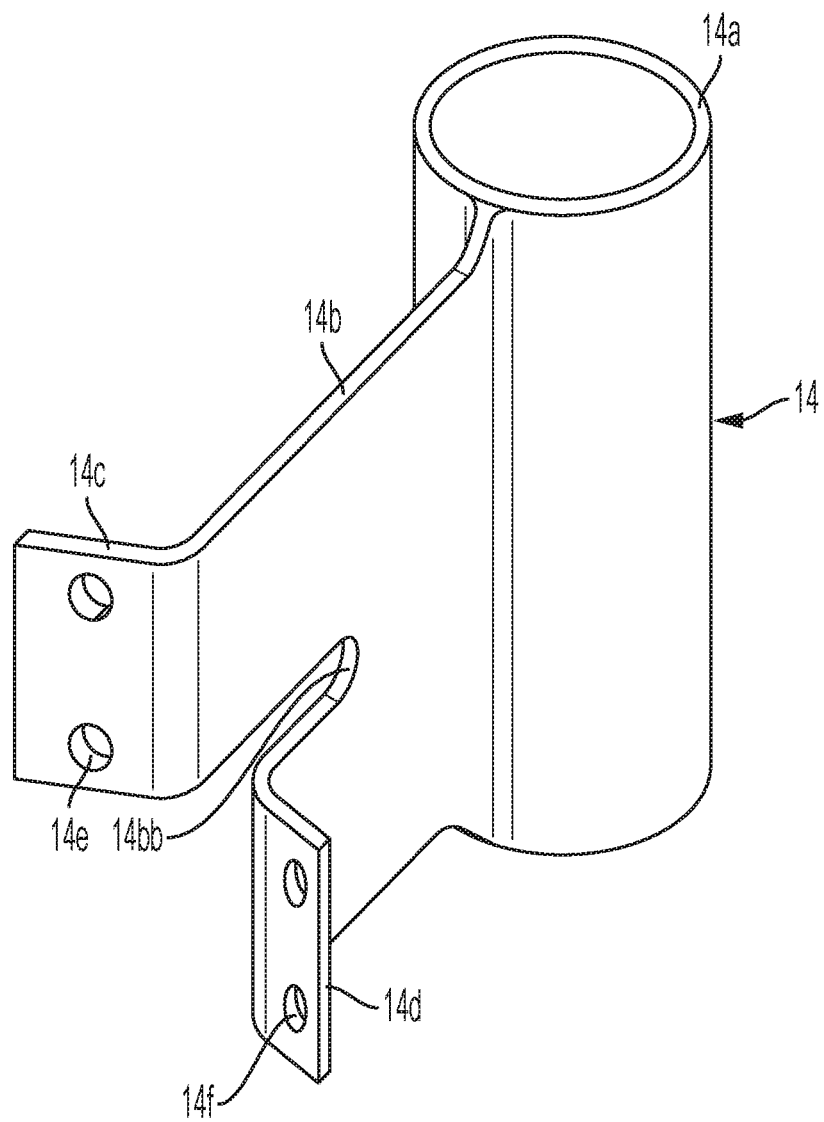
FIG. 4 shows a rear perspective view of the fender mooring bracket.

The mooring bracket 14 supports the fender main body upper first tube 12a vertically in a mooring bracket cylindrical chamber 14a. The vertical upper tube cap 12a is sealed and attached to first tube 12a and prevents the upper fender body 12a tube from sliding downwardly because the cap 12c has a larger bottom edge diameter 12d for preventing downward movement of the fender body 12. The mooring bracket 14 is suitably made of aluminum or metal or durable plastic and is very strong and rigid. The flat, vertical spacer portion 14b has enough width from the tabs 14c to the tubular housing 14a to provide five or more inches of space between the fender body 12a and any mooring facility or piling 18. The purpose is to minimize a hard impact between the vertical main fender body and the mooring facility due to waves or boat action FIG. 3 and FIG. 4 show a top plan view and perspective view respectively of the mooring bracket 14 used to support the fender main body vertically. The mooring bracket 14 includes a cylindrical passage 14a that receives the fender body upper tube 12a, a flat spacer area 14b that extends perpendicular from the fender body support cylinder 14a terminating laterally with upper and lower fastener tabs 14c and 14*d*, which extend horizontally, angularly and away from bracket spacer 14*b*. The fastener tabs 14*c* and 14*d* are used to fasten the bracket 14 to a mooring facility such as a piling, pier or dock with bolts through two apertures located in each fastening tab 14*c* and 14*d*. Typically, tabs 14*c* and 14*d* have apertures 14*e* and 14*f* that receive bolts (or screws) to firmly affix the bracket to a permanent mooring facility structure. The lengths and angles of the fastener tabs, relative to each other, can be varied, depending on any type of particular or unique mooring facility structure for attachment of tab 14*c* separated from tab 14*d* by a recess 14*bb* so that there is some space between the different angles of upper tab 14*c* and lower tab 14*d* The mooring bracket 14 can be constructed of rigid metal such as aluminum or stainless steel to prevent weather and rusting, while maintaining a firm, strong support of the fender.

Figure 5:
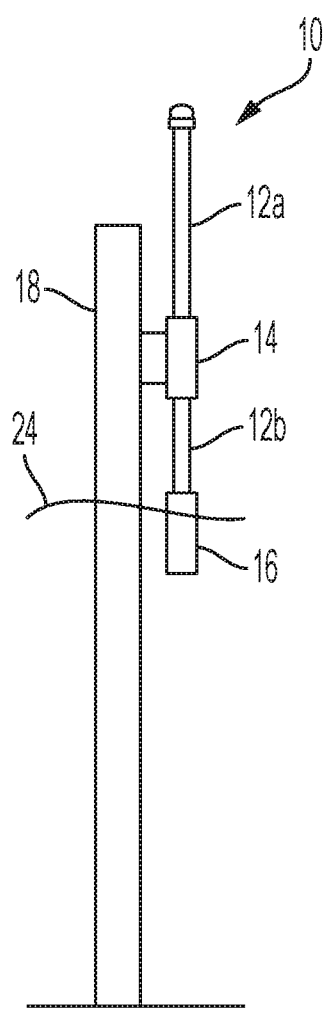
FIG. 5 shows a schematic elevational view of the invention at high tide.

Referring now to FIG. 5, the invention 10 includes floating telescopic fender body tube 12*a* and tube 12*b* shown floating on ballast 16 at high tide, represented by water surface 24. Note that the entire fender body 12*a* and 12*b* is above the water such that marine growth cannot attach itself at any time to the fender body 12*a* or 12*b*. Element 18 represents a mooring facility such as a piling (to which bracket 14 is attached).

Figure 6:
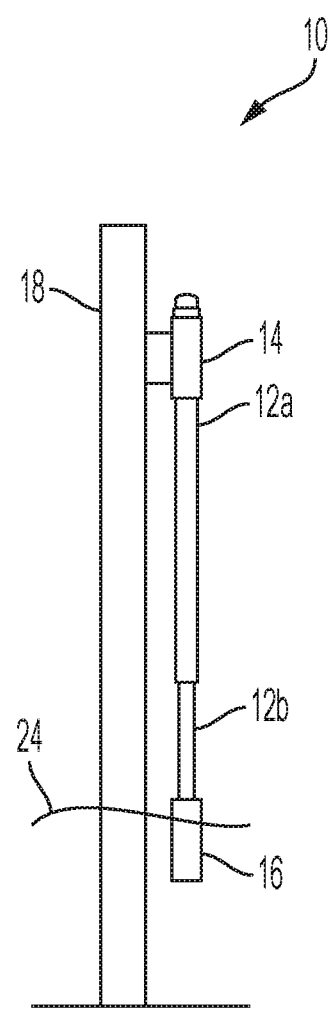
FIG. 6 shows a schematic elevational view of the invention at low tide.

Referring now to FIG. 6, fender body tubes 12*a* and 12*b* are floating on ballast 16 and are above water surface 24, shown at low tide. Again the entire fender body (tubes 12*a* and 12*b* is above the water 24, preventing any type of marine growth, even at low tide. The telescopically-extended first and second tubes bodies 12*a* and 12*b* are shown to demonstrate how the fender is useful at extreme tidal high and low variations by the fender tubes 12*a* and 12*b* extended total length combined.

Employing the present invention at a mooring facility greatly enhances the boat fender in strength with two telescopic, concentric tubes, for enhanced tidal variation, and reduction of marine growth while protecting a boat from engaging the mooring facility.

The foregoing disclosure, description, and figures are for illustrative purposes only, and do not in any way limit the invention, which is defined by the claims.

The invention claimed is:

1. A boat fender and mooring bracket for attachment to a mooring facility piling comprising:
   an elongated PVC boat fender body having a first upper, outer tubular section and a second lower, inner tubular section, coaxially and telescopically-joined for concentric movement longitudinally and having a fender body top end and a bottom end;
   a water sealing cap connected over the top end of said boat fender body;
   a water cylindrical ballast having a longitudinal axis connected to the bottom end of said fender body, coaxially to said second lower inner section, said water ballast having a volume to displace water equal in weight to said fender body, whereby said water ballast is sufficient buoyant to support said fender body vertically above a body of water; and
   a metal mooring bracket integrally formed having an outer tubular vertical fender body support, movably connected to said boat fender body for vertically positioning and supporting said elongated boat fender body significantly above a water surface and two inner positioned, mooring facility fastener receiving tabs, each tab having apertures that receive fasteners that connect fasteners connectable to mooring facility pilings, said bracket having a fender body mooring facility center vertical flat spacing area between said outer fender tubular support and said inner fastener two tabs, each tab spaced apart vertically and projecting laterally at an angle to each other and at at an angle to said mooring bracket center vertical flat spacing area for tab contact with a piling, whereby the mooring bracket allows the elongated fender body to move vertically between a high tide and a low tide, suspended substantially above the water, spaced away from the bracket fasteners tabs to reduce fender contact with a mooring facility and to prevent marine growth on said fender body.

2. A boat fender as in claim 1, including:
   mooring facility fasteners connected to said bracket tabs for attaching said mooring bracket to a mooring facility above said water.

3. A boat fender as in claim 1, wherein:
   said elongated boat fender body has first and second tubes concentrically joined for extra strength and extendability and collapsibility in large tidal high, low areas.

4. A boat fender vertically positioned and movably connected to a mooring bracket for rigid attachment to a mooring facility comprising:
   a first elongated tubular fender body having a first end and a second end; a sealed moisture resistant cap connected over said first elongated tubular fender body first end;
   a second elongated tubular fender body, having a first end and a second end, a portion of its second tubular elongated body moveably, coaxially and telescopically mounted inside and through the second end of said first elongated fender body;
   a metal mooring bracket, integrally formed as a unitary piece, having a tubular, positioning, fender body support at one end of said mooring bracket for vertically supporting said first tubular fender body, a flat rigid lateral spacing member integrally connected continuously longitudinally to an exterior segment of said mooring bracket tubular fender body support from top to bottom, and said rigid lateral spacing member integrally connected along its opposite side to a first mooring bracket fastener receiving tab and a second mooring bracket fastener receiving tab, said first mooring bracket tab positioned above said second mooring bracket tab separated by a lateral space; said first mooring bracket fastener tab and said second mooring bracket fastener tab extending horizontally along said separating space between said first mooring bracket fastener tab and said second mooring bracket fastener tab and extending away from said rigid lateral spacing member; said first mooring bracket fastener tab having an end flat area containing at least one fastener aperture for receiving a mooring facility fastener and curved angularly away from said rigid lateral spacing member, and said second mooring bracket fastener tab having an end flat area containing at least one fastener aperture for receiving a mooring facility fastener and curved angularly away from said rigid lateral spacing member in the opposite direction of said first mooring bracket fastener tab; said first mooring bracket fastening tab end flat area and said second mooring bracket fastening tab end flat area forming an angle above and below each other for engaging a mooring facility circumference for fastening the mooring bracket to a mooring facility;
   said first elongated tubular fender body mounted coaxially and movably in said mooring bracket tubular positioning fender body support; said outside diameter of said first elongated tubular fender body being smaller than the inside diameter of said mooring bracket tubular positioning fender body support; said first elongated tubular fender body end cap on said first end being larger than the mooring bracket tubular positioning fender body support exterior diameter for supporting said first elongated tubular fender body coaxially, vertically within said mooring bracket tubular positioning fender body support when said end cap attached in the first end of said first elongated tubular fender body contacts said mooring bracket tubular positioning fender body support; and a cylindrical ballast connected at one end to said second tubular fender body second end, said ballast having sufficient buoyancy to support both said first elongated tubular fender body and said second elongated tubular together vertically above a body of water to prevent marine growth from said second elongated tubular fender body.

\* \* \* \* \*